Patented Dec. 5, 1939

2,182,440

UNITED STATES PATENT OFFICE 2,182,440

PROCESS OF EXTINGUISHING BURNING LIGHT METALS AND PREVENTING THEIR IGNITION

Fritz Kotz, Magdeburg, and Armin Bergmann, Dessau, Germany, assignors to Junkers Flugzeug-und Motorenwerke Aktiengesellschaft, Dessau, Germany No Drawing. Application May 1, 1937, Serial No. 140,274. In Germany April 4, 1936

5 Claims. (Cl. 23—12)

This invention relates to an agent for extinguishing burning light metals and adapted for use in the boring and cutting of light metals for the purpose of preventing spontaneous ignition thereof.

The fires which frequently occur when machining or otherwise operating on light metal alloys have hitherto been fought by pouring on air-excluding agents, such as sand, metal cuttings and the like. In this way, however, fires could never be fought satisfactorily, as the burning cuttings of the alloy continue to burn under a covering of the sand or inert metal cuttings. More particularly, when the oxygen of the air found access again, there was a fresh outbreak of fire. As is well known these fires are particularly dangerous in the presence of moisture, as an explosive mixture of hydrogen and oxygen is formed and the spreading of the seat of the fire is particularly facilitated in the presence of moisture.

According to the present invention the extinguishing of such burning light metals is effected by an agent, the chief constituent of which is water. The water is preferably used in the form of an emulsion with oil. This emulsion also contains water-soluble silicates, such as water glass, and may contain soluble substances which have per se a fire-preventing property, such as ammonium carbonate.

For producing this emulsion, oil having as high a flash point as possible is used. An oil will be preferably chosen, which has a relatively high content of saponifiable constituents. The employment of a saponifiable oil has the advantage, that through the combination with the inorganic constituents a durable emulsion is obtained.

An emulsion is for instance used, which consists of 75% water and 25% oil and contains per litre about 100 to 150 gr. of water glass and about 10 to 20 gr. of ammonium carbonate. An emulsifier or a protective colloid as well may be added.

For producing the proposed emulsion the procedure is somewhat as follows:

For obtaining about 2 litres of extinguishing liquid half a litre of saponifiable oil with for instance 10% saponifiable constituents such as lard oil, oleo oil, oleic acid or similar product is well stirred up with half a litre of water. (See U. S. Patent 1,317,617.) To this emulsion are added 30 gr. of ammonium carbonate dissolved in about 250 ccs. of water. After adding 350 gr. of water glass the solution is allowed to stand for about 24 hours. Should a film of oil be formed, this is skimmed off and the liquid mixture or emulsion obtained is passed through a sieve and freed from any separations or residue which may have been formed. The residue is again treated with ¾ litre water and 100 gr. water glass and is also passed through a sieve after standing for several hours and is finally added to the main liquid.

The liquid thus obtained is already fit for use. Preferably however it will again be passed through a sieve, in order to remove any precipitations.

The mode of production described above can of course be suitably modified. For instance, the ammonium carbonate and the water glass may first be dissolved in a quantity of water, the total quantity of oil and the rest of the water being at the same time added. It is also possible instead of using an emulsion to work only with an aqueous solution. In this case aqueous solutions of soluble silicates with an addition of ammonium carbonate will then be used. The concentration of the silicate solution will depend on the purpose for which the liquid is to be used. During the process an alkali hydroxide solution will preferably be added, with the object of again bringing into solution any silicic acid which may have been separated out in flocks. An aqueous solution of this kind contains for instance 22.5% water glass, 2.5% potash lye and 1.5% ammonium carbonate. The liquid thus obtained shows sufficient keeping quality for fire extinguishing purposes and stability for keeping in stock for a long time. When applied to burning light metals, instantaneous extinction results, whilst with the agents hitherto used it has not been possible to extinguish fires of this kind.

A further important inherent property of the extinguishing agent consists in, that it does not attack metal parts and more particularly any soiling of the machine tools and the like is avoided. When using sand in the known manner for extinguishing such burning light metals, it was not possible to continue to use delicate machine tools without costly cleansing operations. In contradistinction thereto it is possible to use an agent according to the present invention even as a fire preventative, since cuttings soaked with the extinguishing liquid and cuttings wetted with it will not burn when they are moist. The sheet metal chip guards of the machines may therefore be filled with the extinguishing liquid, in order to keep the falling cuttings moist and thus not even to allow any fire which starts at the tool to spread.

In this way it is also possible to increase the output of the machines. As is well known, owing to the great spreading of a fire caused by water while light metal is being machined, it is not possible to use water as the cooling agent. For this reason it has been necessary to work in the dry state, resulting in a smaller output or in greater wear of the tools. When using the extinguishing liquid according to the present invention as a preventative in the chip-collecting vessel and the like, it is possible to work without any fear of the chips becoming ignited, as instantaneous quenching always takes place. The liquid made in accordance with the present invention is also suitable for use as a cooling agent.

This liquid may also be used as a cooling liquid in boring or cutting operations.

It should also be stated, that, when using the described agent, deleterious vapors and the like will not be formed. There is also no corroding action. Light metal chips or parts will only show a dark discoloration at the surface without the slightest penetration. Chips having such a surface layer are also more difficult to ignite.

We claim:

1. The process of extinguishing light metals when ignited, which consists in wetting said burning metals with a dilute aqueous solution of a silicate, said solution containing particles of a saponifiable oil dispersed therein.

2. The process of extinguishing light metals when ignited, which consists in wetting said burning metals with a dilute aqueous solution of a silicate, said solution containing also an emulsified saponifiable oil.

3. The process of extinguishing light metals when ignited, which consists in wetting said burning metals with a dilute aqueous solution of water glass, said solution containing also an emulsified saponifiable oil.

4. The process of extinguishing light metals when ignited, which consists in wetting said burning metals with a dilute aqueous solution of water glass, said solution containing also an emulsified oil.

5. The process of protecting light metals from becoming ignited and of extinguishing them when ignited, which consists in wetting said metals with a dilute aqueous solution of water glass and ammonium carbonate, said solution containing also an emulsified oil.

FRITZ KOTZ.
ARMIN BERGMANN.